United States Patent [19]
Sakai et al.

[11] Patent Number: 5,502,457
[45] Date of Patent: Mar. 26, 1996

[54] FIBER OPTIC FACE PLATE FOR A SEAMLESS MODULAR DISPLAY

[75] Inventors: Keiji Sakai, Nara; Hiroyuki Yamamoto; Yukio Kurata, both of Tenri, all of Japan

[73] Assignee: Sharp Kabushiki Kaisha, Osaka, Japan

[21] Appl. No.: 234,666

[22] Filed: Apr. 28, 1994

[30] Foreign Application Priority Data

Apr. 28, 1993 [JP] Japan .................................. 5-103311

[51] Int. Cl.⁶ .......................... G09G 3/36; G02F 1/1335; G02B 6/06
[52] U.S. Cl. .............................. 345/87; 345/903; 359/42; 385/116; 385/120; 385/901
[58] Field of Search ..................... 345/32, 1, 87, 345/903; 359/42; 362/32; 348/904, 840; 385/115, 116, 120, 901, 121, 129, 131

[56] References Cited

U.S. PATENT DOCUMENTS

| | | | |
|---|---|---|---|
| 4,299,447 | 11/1981 | Soltan et al. | 359/42 |
| 4,601,537 | 7/1986 | Saccocio | 345/32 |
| 4,747,648 | 5/1988 | Gilliland, III | 385/115 |
| 4,761,641 | 8/1988 | Schreiber | 345/1 |
| 5,129,028 | 7/1992 | Soltan | 385/120 |
| 5,251,280 | 10/1993 | Asada | 385/115 |
| 5,293,437 | 3/1994 | Nixon | 385/115 |
| 5,303,085 | 4/1994 | Rallison | 385/116 |
| 5,329,386 | 7/1994 | Birecki et al. | 359/42 |

Primary Examiner—Steven Saras
Attorney, Agent, or Firm—Morrison & Foerster

[57] ABSTRACT

A display apparatus of the present invention includes at least one display element having a display screen and an optical element for transiting an image from an input end face thereof to an output end face thereof. The optical element includes a first optical block and a second optical block each having a plurality of optical fibers combined together. The first optical block is connected to the display screen. One end face of the second optical block constitutes the output end face of the optical element. The numerical aperture of the optical fiber of the first optical block is smaller than the numerical aperture of the optical fiber of the second optical block. A diameter of the optical fiber of the first optical block is smaller than the diameter of the optical fiber of the second optical block.

7 Claims, 7 Drawing Sheets

FIBER OPTIC FACE PLATE FOR A SEAMLESS MODULAR DISPLAY

BACKGROUND OF THE INVENTION

1. Field of the Invention

The present invention relates to a display apparatus to obtain a seamlessly synthesized image from images displayed on a plurality of display elements.

2. Description of the Related Art

In a large-screen display apparatus, a plurality of relatively small image display elements such as liquid crystal display elements are arranged in rows and columns to form a display apparatus as a whole, thereby creating a large screen.

Figure 8:
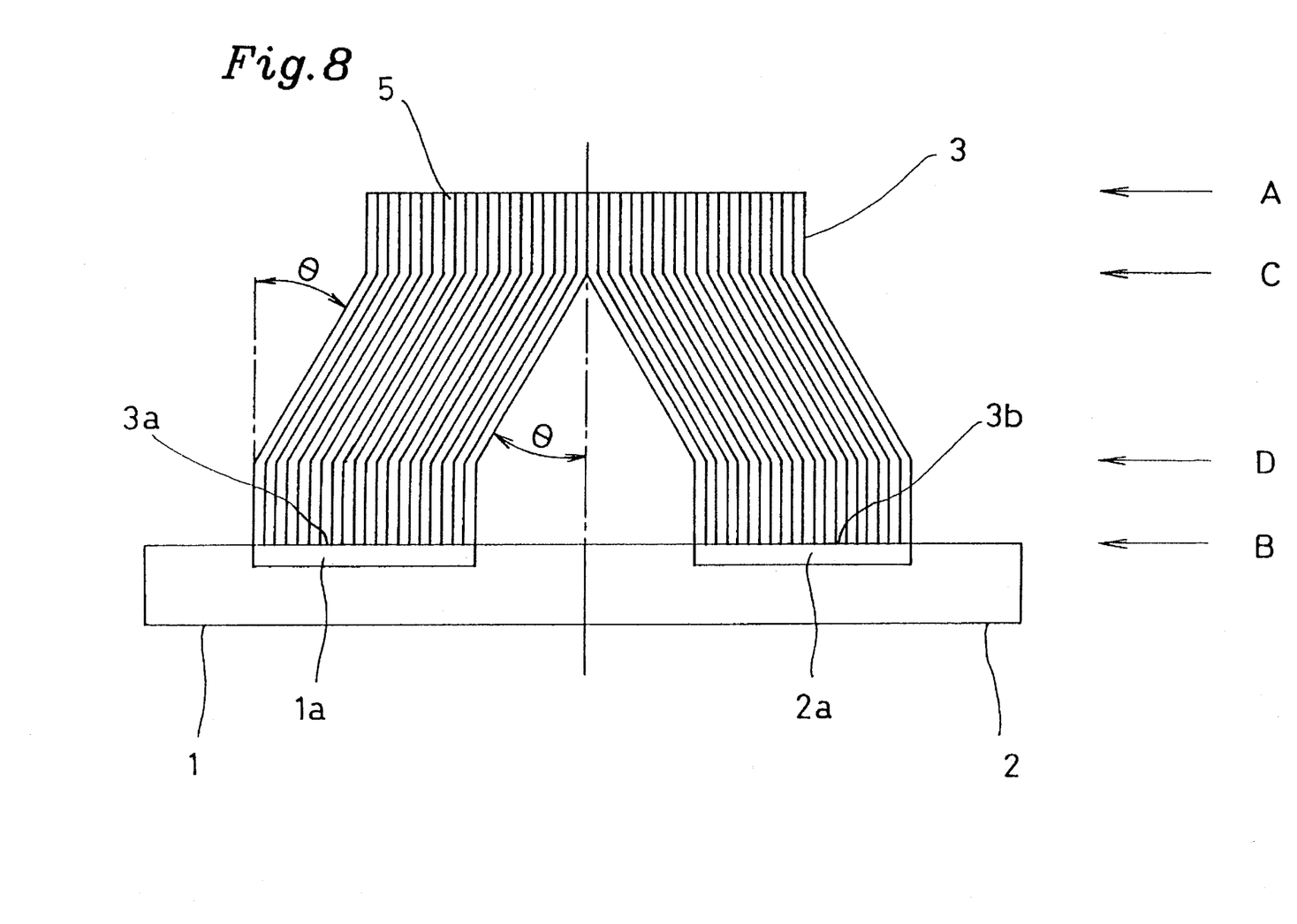
FIG. 8 is a cross sectional view of the conventional display apparatus.

FIG. 8 shows a cross sectional view of a conventional large-screen display apparatus. The display apparatus is provided with a plurality of liquid crystal elements 1, 2, and an optical fiber bundle 3 which transmits images. The liquid crystal display elements 1, 2 have display screens 1a, 2a (plane B), respectively. Input end faces 3a, 3b of the optical fiber bundle 3 are connected to the display screens 1a, 2a. With such a constitution, images can be formed without boundary at the output end face (plane A) of the optical fiber bundle 3.

Figure 9:
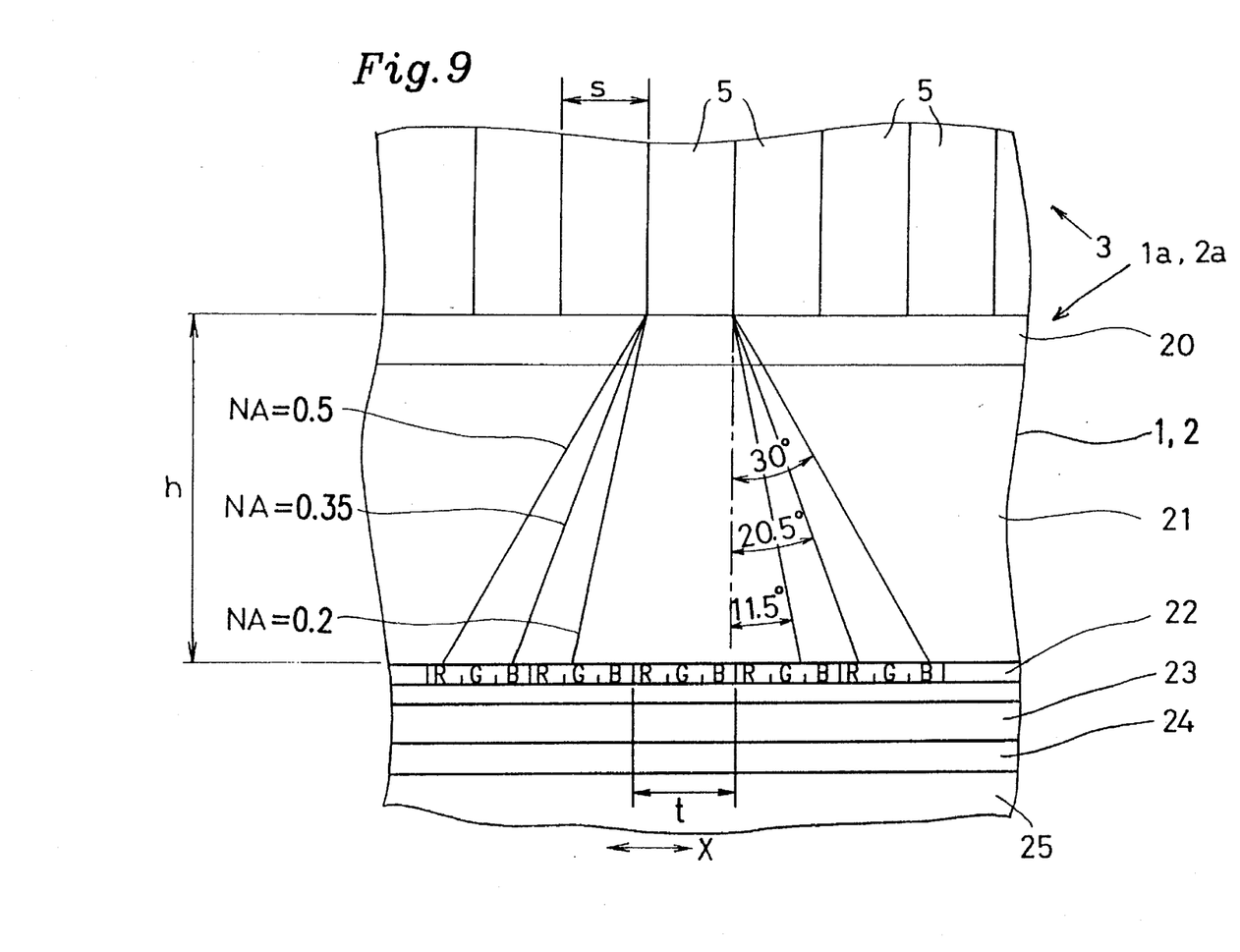
FIG. 9 is an enlarged cross sectional view illustrative of a part of the conventional display apparatus.

FIG. 9 shows an enlarged view of a joint between the display screens 1a, 2a of the liquid crystal display elements 1, 2 and the optical fiber bundle 3 of the display apparatus described above. The liquid crystal display elements 1, 2 have a glass substrate 21, a substrate (not shown in the drawing) arranged to oppose the glass substrate 21 and a liquid crystal layer 25 sandwiched therebetween. On the liquid crystal layer 25 side of the glass substrate 21, a color filter 22, a transparent electrode 23 and an alignment film 24 are superimposed in this order, and a polarizer 20 is provided on the display screens 1a, 2a side. The color filter 22 and the end face of the optical fiber bundle 3 are separated by a distance h.

Each of the optical fibers 5 used in the optical fiber bundle 3 usually has a numerical aperture (NA) of about 0.5. Therefore image information which is output from the color filter 22 of the liquid crystal display elements 1, 2 is taken into each optical fiber 5 of the optical fiber bundle 3 in an angle of about 30°.

Now assume typical dimensions for the components; about 300 μm for the size t of each pixel of the 4-inch liquid crystal display elements 1, 2 (one set of R, G, B elements of the color filter 22 corresponds to one pixel), 250 μm for diameters of the optical fiber 5 and about 1 mm for the distance h which is the sum of the thickness of the polarizer 20 and the thickness of the glass substrate 21. In this case, the number of pixels of which image information is taken into one optical fiber 5 is around five in the X direction as is shown in FIG. 9. When the depth direction (direction perpendicular to the paper) is taken into consideration, the number of pixels corresponding to one optical fiber 5 becomes around seventeen. This means that the image information carried by one optical fiber 5 is a mixture of image information from a plurality (around seventeen in this case) of pixels, which results in deterioration of the resolution of display and decreased contrast of the image displayed at the output end face of the optical fiber bundle 3.

In the display apparatus described above, factors which determine the output image contrast are the distance h which is the sum of the thicknesses of the polarizer 20 and the glass substrate 21, and the numerical aperture of the optical fiber 5. Since there is a limitation in decreasing the distance h, the distance h cannot be decreased enough to obtain a sufficiently high contrast.

Thus consider an attempt to decrease the value of the numerical aperture of the optical fiber 5 thereby to decrease the number of pixels corresponding to one optical fiber 5. For example, by setting the value of numerical aperture of the optical fiber 5 to about 0.2, the number of pixels becomes around two for the X direction in FIG. 9. Therefore, when the depth direction is taken into account, the number of pixels corresponding to one optical fiber 5 can be decreased to around four. In such a case, however, because the angle of emergence of light from the output end of the optical fiber bundle 3 tends to decrease, the viewing angle decreases thereby deteriorating the visibility of the displayed image and changing the color of the displayed image.

The problem of decreasing the viewing angle may be solved by means of providing a scattering plate or the like on the output end of the optical fiber bundle 3. However, it causes white blurring to accompany the increase in the viewing angle. Another means of changing the values of the numerical aperture at the input end face and numerical aperture at the output end face within one optical fiber 5 may be conceived, but this is impossible to manufacture. Thus images of high display contrast and good quality have not been obtained in the conventional art.

Moreover, there is another problem of occurrence of moiré fringes. Moiré fringes occur when any two of stripes having a certain period are superimposed upon each other. The absence of moiré fringes occurs only when the periods of the stripes are identical and there is no off-set between the two stripes. The closer the periods of the two stripes are, the more distinct the moiré fringes become. In the conventional display apparatus, as described above, the size t of each pixel of the liquid crystal display elements 1, 2 is about 300 μm, and the diameter s of the optical fiber 5 is 250 μm, which is close to the size t. Therefore, clear moiré fringes occur in the output end face of the optical fiber bundle 3. To solve this problem, the output end of the optical fiber bundle 3 is roughened, or a scattering plate or the like is provided on the output end of the optical fiber bundle 3. In such a case, however, it also causes deterioration of the resolution and white blurring of the display. The detail description of this problem can be found in Japanese Laid-open (Kokai) Publication No. 4-324490.

SUMMARY OF THE INVENTION

A display apparatus according to the present invention includes: at least one display element having a display screen; and image transition means for transiting an image from an input end face thereof to an output end face thereof, the input end face being connected to the display screen. The image transition means includes a first optical block and a second optical block each having a plurality of optical fibers combined together. The first optical block is connected to the display screen, and one end face of the second optical block constitutes the output end face of the image transition means. A numerical aperture of the optical fiber of the first optical block is smaller than a numerical aperture of the optical fiber of the second optical block, and a diameter of the optical fiber of the first optical block is smaller than a diameter of the optical fiber of the second optical block.

In one embodiment of the invention, the display apparatus further includes viewing angle expanding means connected to the output end face of the image transition means, for expanding a viewing angle of the display apparatus, the viewing angle expanding means having a plurality of optical fibers bundled together. A numerical aperture of the optical fiber of the viewing angle expanding means is larger than the numerical aperture of the optical fiber of the second optical block, and a diameter of the optical fiber of the viewing angle expanding means is smaller than the diameter of the optical fiber of the second optical block.

In another embodiment of the invention, the number of the display elements is two or more, and the output end face of the image transition means constitutes one display screen.

Thus, the invention described herein makes possible the advantages of (1) providing a display apparatus which is capable of forming seamless synthesized images from a plurality of display screens, and is capable of producing images of high contrast and good quality, (2) providing a display apparatus which is further capable of performing a display with a wide viewing angle.

These and other advantages of the present invention will become apparent to those skilled in the art upon reading and understanding the following detailed description with reference to the accompanying figures.

DESCRIPTION OF THE PREFERRED EMBODIMENTS

Preferred embodiments of the invention will now be described below with reference to the accompanying drawings. In the drawings, components having the same functions as those of the conventional display apparatus shown in FIG. 9 will be denoted with the same numerals as those used in FIG. 9.

Embodiment 1

Figure 1:
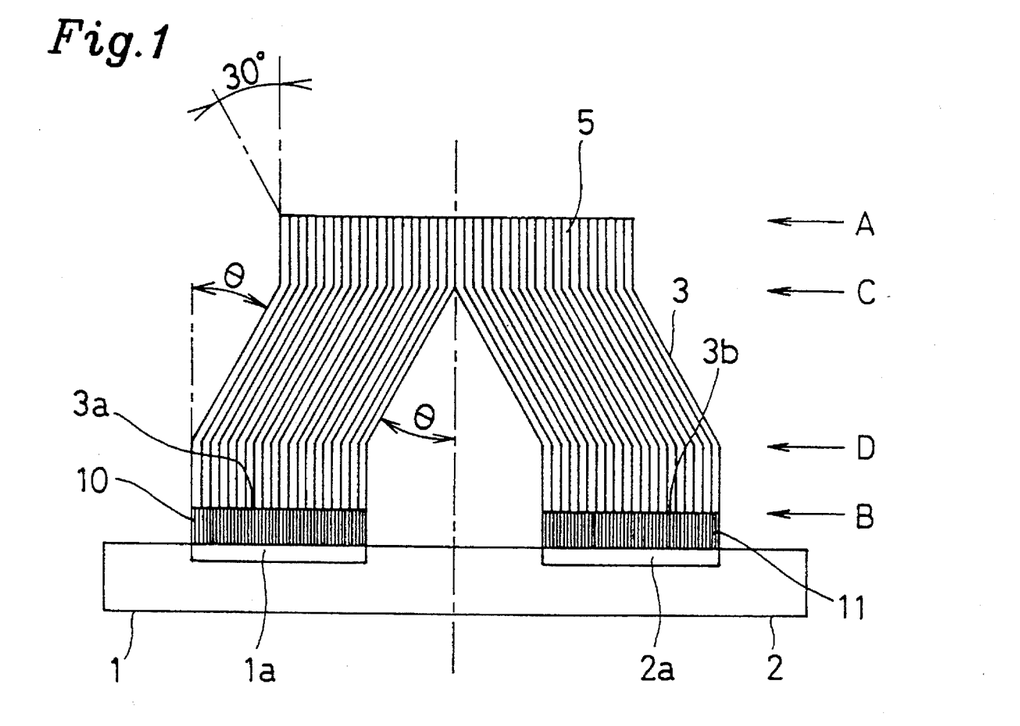
FIG. 1 is a cross sectional view illustrative of the display apparatus of the first embodiment.

FIG. 1 shows a cross sectional view illustrative of the display apparatus of the first embodiment of the invention. The display apparatus has two liquid crystal display elements 1, 2 arranged adjacent to each other, an optical fiber bundle 3 which transmits images, and optical fiber blocks 10, 11 provided for the liquid crystal display elements 1, 2, respectively. The liquid crystal display elements 1, 2 have display screens 1a, 2a, respectively, with the display screens 1a, 2a being arranged at a distance from each other. The display screens 1a, 2a are connected to the optical fiber bundle 3 via the optical fiber blocks 10, 11, respectively.

The optical fiber bundle 3 comprises optical fiber sheets each made by bonding several optical fibers 5 side by side in a row. The optical fiber sheets are stacked on each other into a block. The optical fiber bundle 3 is divided into two parts, each bending by an angle θ at a plane C located at a point in the length of the optical fiber bundle 3, to be separated at the input side (liquid crystal display elements 1, 2 side), which further bend at a plane D located at a mid point from the plane C to a plane B, which is the input end face, by an angle θ in the opposite direction to that at the plane C. The output end face of the optical fiber bundle 3 is a flat plane, and the two divided input end faces 3a, 3b also constitute a flat plane. Consequently, a plane A which is the output end face of the optical fiber bundle 3 and the plane B which is the input end face 3a, 3b are parallel with each other. One input end face 3a of the divided two portions is connected to the optical fiber block 10 so that the optical fibers 5 are at right angles to the interface. The other input end face 3b is connected to the optical fiber block 11 so that the optical fibers 5 are at right angles to the interface. Thus each of the optical fibers 5 of the optical fiber bundle 3 at the output end is directed in a direction perpendicular to the display screens 1a, 2a. On the output end face of the optical fiber bundle 3, the optical fibers 5 are arranged at a constant pitch.

Figure 2:
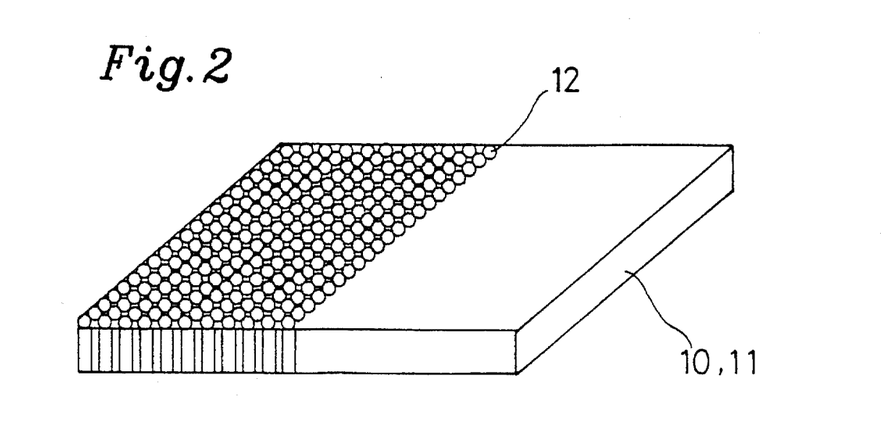
FIG. 2 is a perspective view of the optical fiber block used in the display apparatus of the first embodiment.

FIG. 2 shows a perspective view of the optical fiber blocks 10, 11. The optical fiber blocks 10, 11 are sheet-like optical blocks comprising a plurality of optical fibers 12 having specified length combined together. The plurality of optical fibers 12 are arranged to make flat planes at both ends of the optical fiber blocks 10, 11. Peripheries of the optical fibers 12 are bonded with an adhesive. The optical fiber blocks 10, 11 are connected to the display screens 1a, 2a so that the optical fibers 12 are perpendicular to the screens.

Color of the adhesive is preferably black. This causes the adhesive to absorb light leaking from the optical fibers 12 thereby preventing the adjacent optical fibers 12 from absorbing unwanted light. Similar effect can also be obtained by providing light absorbing layers between the optical fibers 12.

According to the invention, the diameter of the optical fibers 12 constituting the optical fiber blocks 10, 11 is smaller than that of the optical fibers 5 which constitute the optical fiber bundle 3. Because of this, moiré fringes can be reduced and deterioration of the resolution of display can be prevented. The smaller the diameter of the optical fibers 12, the more effectively any occurrence of the moiré fringes can be prevented. In view of the moiré fringes, preferably, diameter of the optical fibers 12 is ½ that of the optical fibers 5 or less. Length of the optical fibers 12 is also preferably short, because this enables it possible to make the overall thickness of the display apparatus smaller. However,the length of the optical fibers 12 should preferably be 1 to 2 mm or greater in order to prevent display failure due to cross talk of light between adjacent optical fibers 12.

Also according to the invention, the numerical aperture of the optical fibers 12 constituting the optical fiber blocks 11, 12 is smaller than the numerical aperture of the optical fibers 5 constituting the optical fiber bundle 3. For example, while the numerical aperture of the optical fibers 5 is about 0.5, the numerical aperture of the optical fibers 12 can be around 0.2 to 0.35. Smaller value of numerical aperture of the optical fibers 12 causes image information from a smaller number of pixels to be taken into the optical fiber blocks 10, 11.

In this embodiment, the optical fibers 12 having a diameter 30 μm, length 2 mm and numerical aperture 0.35 are used to constitute the optical fiber blocks 10, 11, and the optical fibers 5 having a diameter 250 μm and numerical aperture 0.5 are used to constitute the optical fiber bundle 3.

Figure 3:
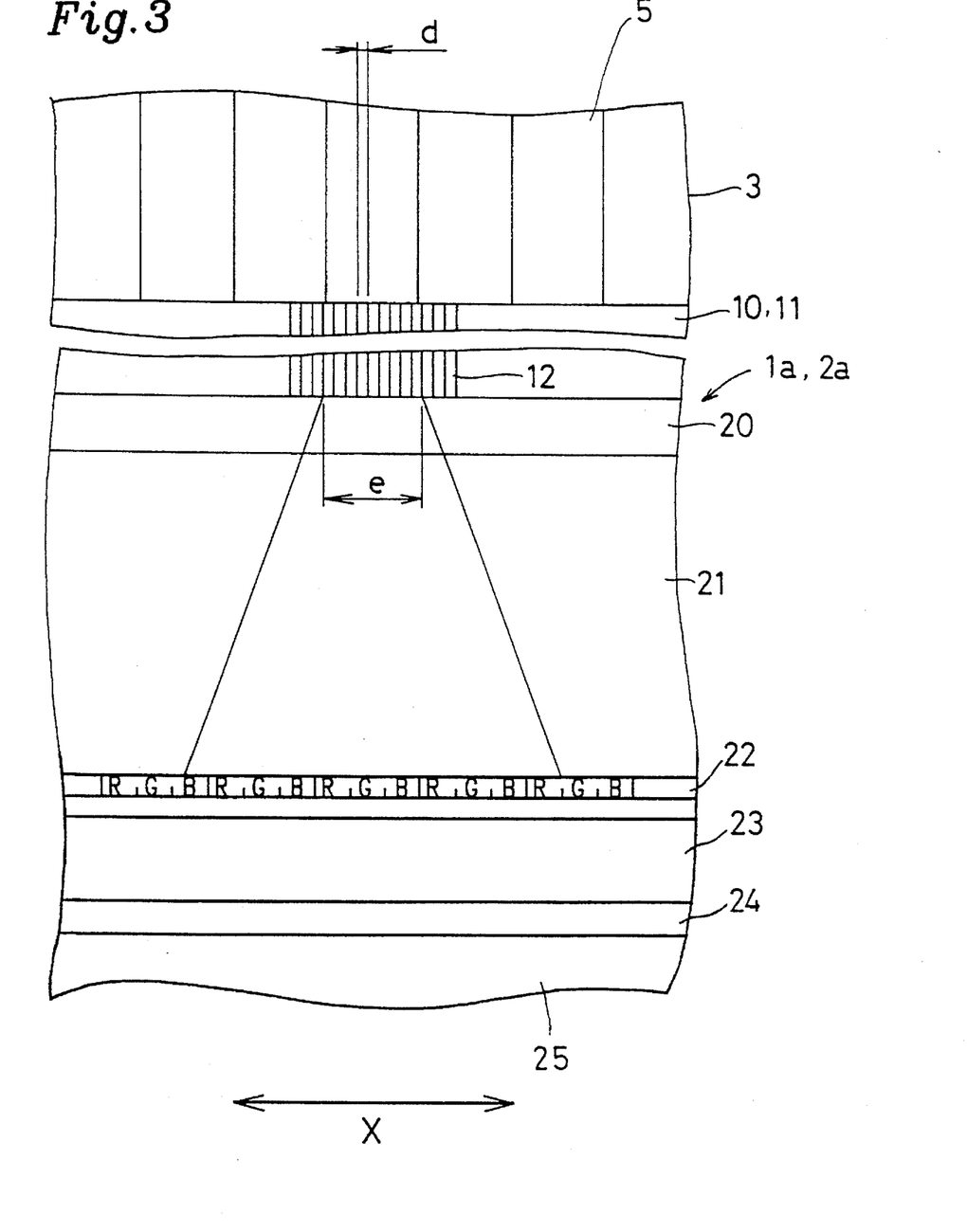
FIG. 3 is an enlarged view illustrative of a part of the display apparatus of the first embodiment.

FIG. 3 shows an enlarged view of the joint between the display screens 1a, 2a of the liquid crystal display elements 1, 2, the optical fiber blocks 10, 11 and the optical fiber bundle 3 of the display apparatus described above.

In the display apparatus, the optical fiber bundle 3 and the optical fiber blocks 10, 11 are connected with the end faces thereof being in close contact with each other. Image information incident in one optical fiber 5 is limited to the image information which is taken in by the optical fiber 12 within a zone e indicated by an arrow in FIG. 3. Consequently, image information incident to the optical fiber bundle 3 which transmits the image information is determined by numerical aperture of the optical fibers 12 which constitute the optical fiber blocks 10, 11 and by the display resolution (diameter of the optical fiber 12). Therefore, when the size of each pixel of the liquid crystal display elements 1, 2, the distance which is the sum of the thickness of the polarizer 20 and the thickness of the glass substrate 21, and the diameter of the optical fiber 5 are set similarly to the case shown in FIG. 9, the number of pixels of which image information is taken in by one optical fiber 5 becomes around three in the direction X shown in FIG. 3. Because this number is around five in the conventional art shown in FIG. 9, it can be seen that this embodiment is capable of achieving an improvement in the resolution over the conventional art, generating a better contrast of the image as a result.

Furthermore, the period of 30 μm of arrangement of the optical fibers 12 of the optical fiber blocks 10, 11 is quite small compared with the period of 250 μm of the optical fiber 5 of the optical fiber bundle 3 and the period t of about 300 μm of the pixels of the liquid crystal display elements 1, 2. Therefore, the distinctness of any moiré fringes is lowered, thus the quality of display increases with respect to the conventional display apparatus.

Embodiment 2

Figure 4:
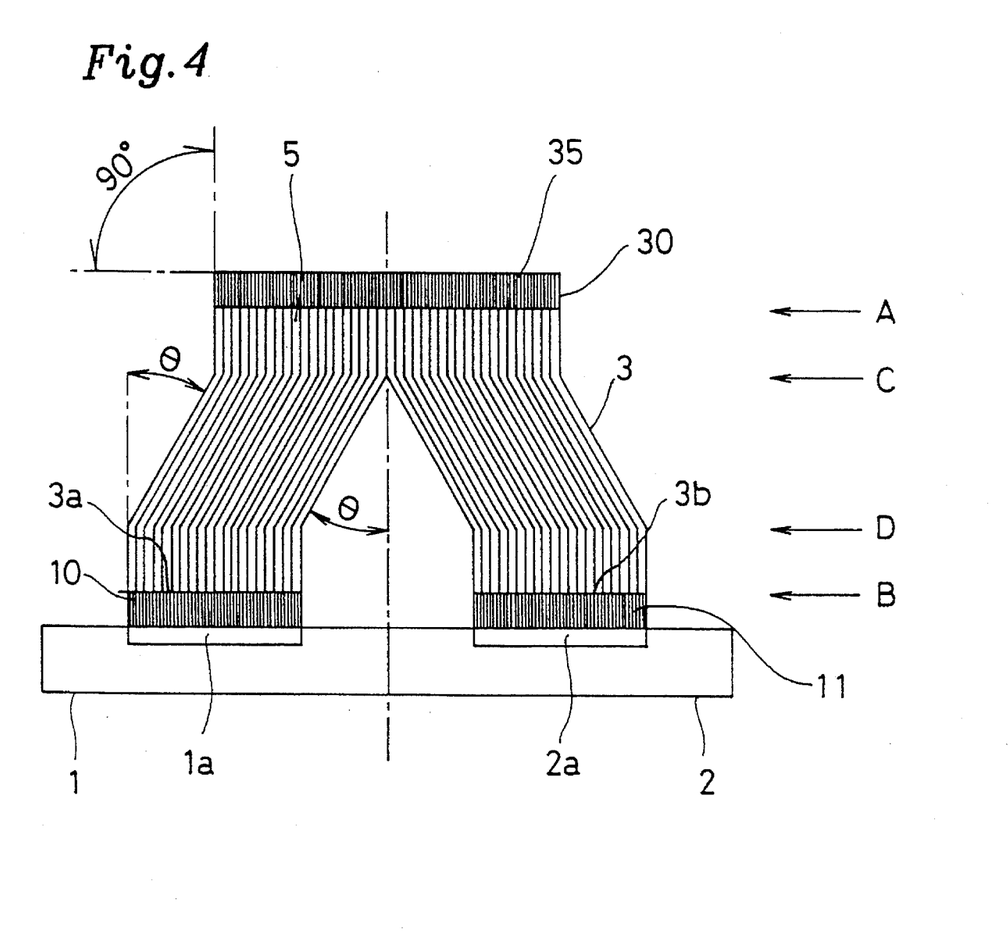
FIG. 4 is a cross sectional view illustrative of the display apparatus of the second embodiment.

FIG. 4 shows a cross sectional view of the display apparatus of the second embodiment. The display apparatus has an optical fiber block 30 connected to the optical fiber bundle 3 so that the optical fiber block 30 is perpendicular to the output end face of the optical fiber bundle 3, in addition to the components of the display apparatus shown in FIG. 1.

The optical fiber block 30 is an optical block comprising a plurality of optical fibers 35 similar to the optical fiber blocks 10, 11 shown in FIG. 2. The optical fiber block 30 is connected to the optical fiber bundle 3 so that the optical fibers 35 are perpendicular to the output end face of the optical fiber bundle 3.

The numerical aperture of the optical fibers 35 which constitute the optical fiber block 30 is greater than numerical aperture of the optical fibers 5 which constitute the optical fiber bundle 3. As the value of numerical aperture of the optical fibers 35 increases, the angle of emergence of light increases. diameter of the optical fibers 35 is smaller than that of the optical fiber 5. Because of this, moiré fringes can be reduced and deterioration of the resolution of display can be prevented. The smaller the diameter of the optical fibers 35 becomes, the more effectively occurrence of the moiré fringes can be suppressed. In view of the moiré fringes, preferably, the diameter of the optical fibers 35 is ½ that of the optical fibers 5 or less. While the length of the optical fibers 35 is preferably short because this enables it to make the overall thickness of the display apparatus smaller, it should preferably be 1 to 2 mm or greater in order to prevent display failure due to cross talk of light between adjacent optical fibers 35.

In this embodiment, the optical fibers 35 having a numerical aperture of 1.0, diameter 30 μm and length 2 mm are used to constitute the optical fiber block 30.

The final output end of the display apparatus is the end face of the optical fiber block 30, and the viewing angle is determined by the numerical aperture of the optical fibers 35 which constitute the optical fiber block 30.

In case the optical fiber block 30 is absent, end face A of the optical fiber bundle 3 becomes the final output end and the numerical aperture of the optical fiber 5 is 0.5, therefore the viewing angle is about 30°. In contrast, because the optical fiber 35 of the display apparatus of this embodiment has a numerical aperture as high as 1.0, the angle of emergence can be made greater and therefore the viewing angle can be increased to ±90°, about three times that of the conventional art.

Embodiment 3

Figure 5:
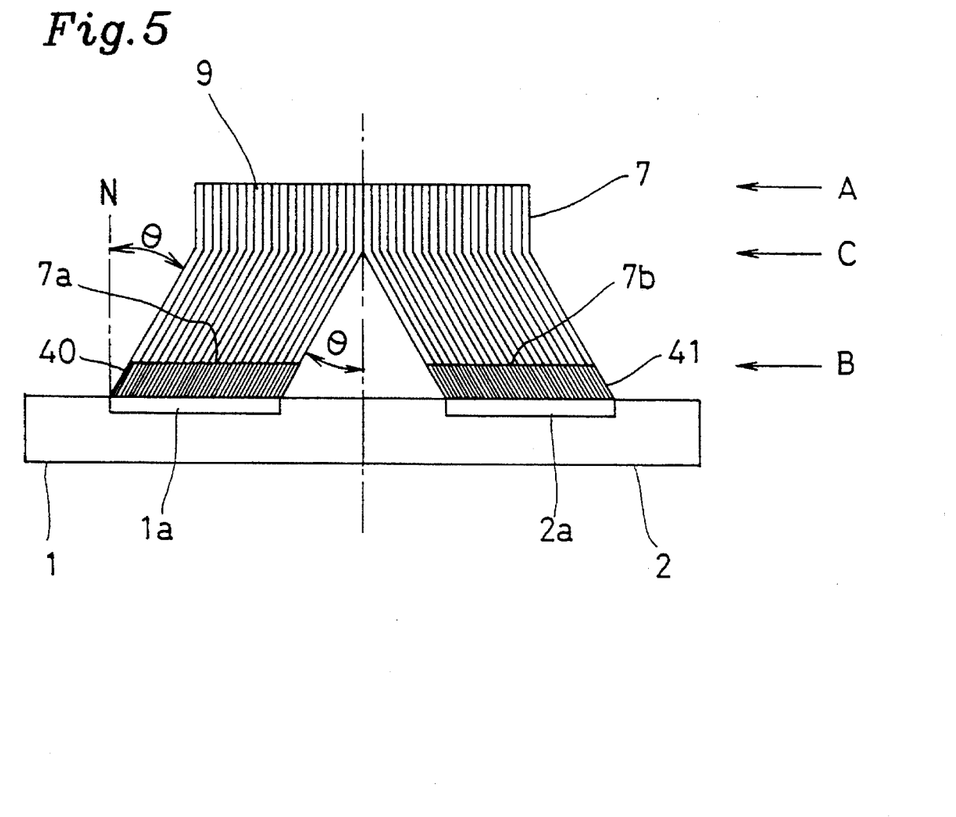
FIG. 5 is a cross sectional view illustrative of the display apparatus of the third embodiment.

FIG. 5 shows a cross sectional view illustrative of the display apparatus of the third embodiment. The display apparatus has two liquid crystal display elements 1, 2 arranged to be adjacent to each other, an optical fiber bundle 7 which transmits images, and optical fiber blocks 40, 41 provided for the liquid crystal display elements 1, 2, respectively. The liquid crystal display elements 1, 2 have display screens 1a, 2a, respectively, with the display screens 1a, 2a being arranged at a distance from each other. The display screens 1a, 2a are connected to the optical fiber bundle 7 via the optical fiber blocks 40, 41, respectively.

The optical fiber bundle 7 comprises optical fiber sheets each made by bonding several optical fibers 5 side by side in a row. The optical fiber sheets are stacked on each other into a block. The optical fiber bundle 7 is divided at a plane C located at a point in the length thereof into two parts in an inverted Y shape, each bending by an angle θ, to be separated at the input side (liquid crystal display elements 1, 2 side). The output end face of the optical fiber bundle 7 is a flat plane, and the two divided input end faces 7a, 7b also constitute a flat plane. Consequently, the plane A which is the output end face of the optical fiber bundle 7 and the plane B which is the input end face are parallel with each other. One input end face 7a of the divided two portions is connected to the optical fiber block 40 so that the optical fibers 9 are tilted by an angle θ to the normal line N of the interface. The other input end face 7b is connected to the optical fiber block 41 so that the optical fibers 9 are tilted by an angle of θ to the normal line of the interface. On the output end face of the optical fiber bundle 7, the optical fibers 5 are arranged at a constant pitch.

Figure 6:
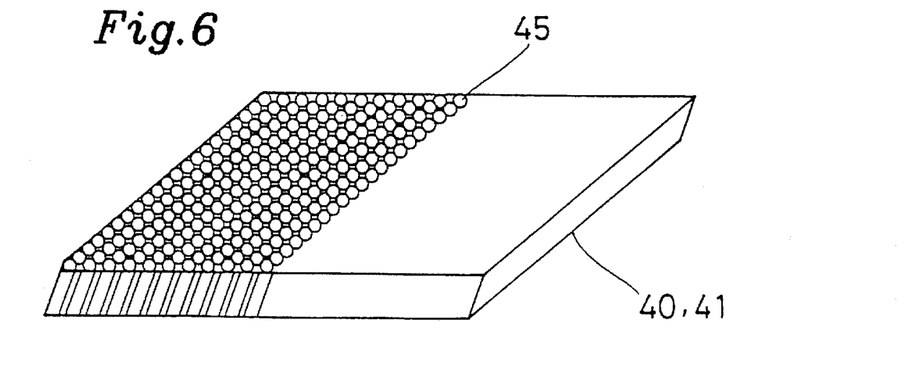
FIG. 6 is a perspective view of the optical fiber block used in the display apparatus of the third embodiment.

FIG. 6 shows a perspective view of the optical fiber blocks 40, 41. The optical fiber blocks 40, 41 are sheet-like optical blocks each made by combining a plurality of optical fibers 45 of a specified length. The plurality of optical fibers 45 are arranged so that both ends of each of the optical fiber blocks 40, 41 are flat planes inclined by an angle θ from each other. Peripheries of the optical fibers 45 are bonded with an adhesive. The optical fiber blocks 40, 41 may also be made by preparing thick optical blocks similar to the case of the optical fiber blocks 10, 11 shown in FIG. 2, and cutting off the end faces at an angle of θ. The optical fiber block 40 is connected to the display screen 1a with the optical fibers 45 being inclined toward the liquid crystal display 2 by an angle θ. The optical fiber block 41 is connected to the display screen 2a with the optical fibers 45 being inclined toward the liquid crystal display 1 by an angle θ.

Color of the adhesive is preferably black. This causes the adhesive to absorb light leaking from the optical fibers 45 thereby preventing the adjacent optical fibers 45 from absorbing unwanted light. A similar effect can also be obtained by providing light absorbing layers between the optical fibers 45.

According to the invention, the diameter of the optical fibers 45 which constitute the optical fiber blocks 40, 41 is smaller than that of the optical fibers 9 which constitute the optical fiber bundle 7. Because of this, moiré fringes can be reduced and deterioration of the resolution of display can be prevented. The smaller the diameter of the optical fibers 12 becomes, the more effectively occurrence of the moiré fringes can be suppressed. In view of the moiré fringes, preferably, diameter of the optical fibers 12 is ½ that of the optical fibers 45 or less. Length of the optical fibers 45 is preferably short, because this enables it possible to make the overall thickness of the display apparatus smaller. However, it is preferable that it has at least such a length as is capable of absorbing leaking light in order to prevent display failure due to cross talk of light between adjacent optical fibers 45.

Also according to the invention, the numerical aperture of the optical fibers 45 which constitute the optical fiber blocks 40, 41 is smaller than the numerical aperture of the optical fibers 9 which constitute the optical fiber bundle 7. For example, while the numerical aperture of the optical fibers 9 is about 0.5, the numerical aperture of the optical fibers 45 can be set to around 0.2 to 0.35. A smaller value for the numerical aperture of the optical fibers 45 causes image information of smaller number of pixels to be taken into the optical fiber blocks 40, 41.

In this embodiment, optical fibers 45 having a diameter 30 μm, length 2 mm and numerical aperture 0.35 are used to constitute the optical fiber blocks 40, 41, and optical fibers 9 having a diameter 250 μm and numerical aperture 0.5 are used to constitute the optical fiber bundle 7.

In the display apparatus, image information incident in one optical fiber 9 is limited to the image information which is taken in by the optical fiber 45. Image information incident to the optical fiber bundle 7 which transmits the image information is determined by the numerical aperture of the optical fibers 45 which constitute the optical fiber blocks 40, 41 and by the display resolution (diameter of the optical fibers 45).

In the display apparatus of this embodiment, because numerical aperture of the optical fibers 45 has a small value similarly to the first embodiment, image information incident in each optical fiber 9 of the optical fiber bundle 7 is decreased and therefore good contrast is obtained.

Embodiment 4

Figure 7:
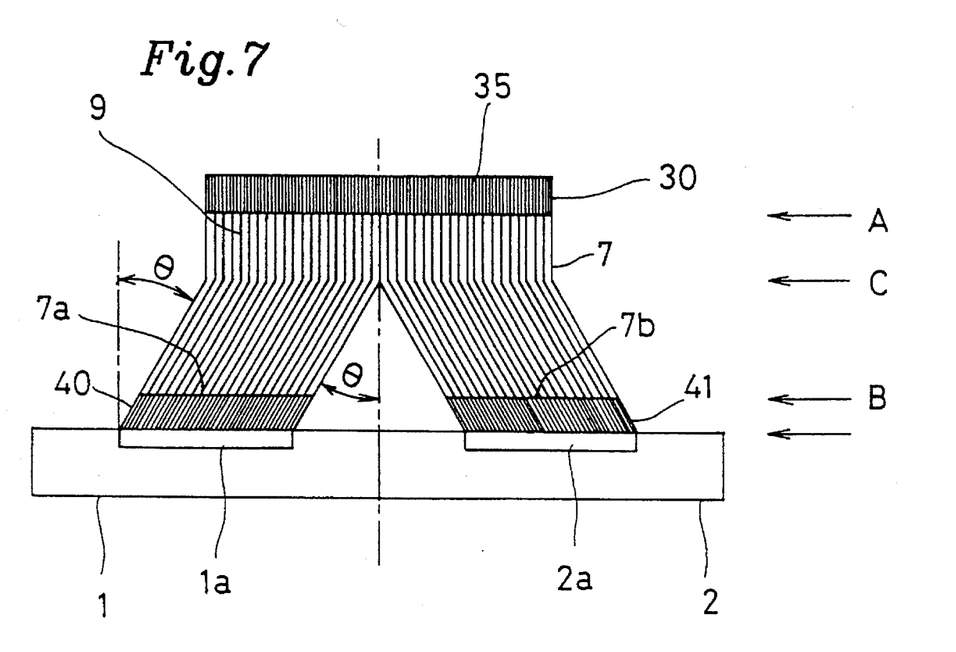
FIG. 7 is a cross sectional view illustrative of the display apparatus of the fourth embodiment.

FIG. 7 shows a cross sectional view of the display apparatus of the fourth embodiment. The display apparatus has, in addition to the components of the display apparatus shown in FIG. 5, the optical fiber block 30 which is connected to the optical fiber bundle 7 so that the fibers are at right angles to the output end face of the optical fiber bundle 7. The optical fiber block 30 is similar to the optical fiber block 30 shown in FIG. 2.

In this display apparatus, the final output end is the end face of the optical fiber block 30, and the viewing angle is determined by numerical aperture of the optical fibers 35 which constitute the optical fiber block 30.

In case the optical fiber block 30 is absent, the end face A of the optical fiber bundle 7 becomes the final output end and the numerical aperture of the optical fibers 9 is 0.5, therefore the viewing angle is about 30°. In contrast, because the optical fibers 35 of the display apparatus of this embodiment have numerical aperture as high as 1.0, the angle of emergence of light can be made greater and therefore the viewing angle can be increased to ±90°, about three times, similarly to the second embodiment.

Also because the optical fibers 35 are of smaller diameter than those of the optical fibers 9 of the optical fiber bundle 7 are used, moiré fringes do not occur and the resolution does not deteriorate.

Although the display apparatus employing two image display elements has been described in the first through fourth embodiments, the invention is not limited to this constitution and a synthesized image can also be formed by means of three or more image display elements. In a case where a display apparatus includes only one display element, an optical fiber bundle can be provided on the display screen of the display element in order to obtain a wide viewing angle. The present invention can also be applied to such a case thereby suppressing occurrence of moiré fringes without any deterioration of the display resolution.

The invention may also be embodied in a constitution where the optical fiber bundle 3 (or 7) is made by using fibers having large numerical aperture values and optical fiber blocks 10, 11 (or 40, 41) comprising optical fibers 12 (or 45) having smaller numerical aperture values and diameters smaller than those of the optical fiber bundle 3, which are connected to the input end face of the optical fiber bundle 3.

Furthermore, the invention may also be embodied in such a constitution as the optical fiber bundle 3 is made by using fibers having small numerical aperture values and the optical fiber block 30 comprising optical fibers 35 having greater numerical aperture values and a diameter smaller than that of the optical fiber bundle 3 is connected to the output end face of the optical fiber bundle 3.

Furthermore, the invention may be embodied by using optical fibers of a small diameter in the optical fiber bundle 3, though optical fibers of small diameter around 30 μm as in the embodiment described above cannot be manufactured unless glass fiber is used. And making the optical fiber bundle 3 by using glass fibers leads to a very high cost and difficulty in mechanical processing such as bending due to the material property, therefore this constitution is not appropriate.

As will be obvious from the above description, the invention is capable of decreasing the number of pixels of which image information is taken into one optical fiber because an optical fiber block, comprising optical fibers of a diameter smaller than that of the optical fibers constituting the optical fiber bundle and numerical aperture smaller than the numerical aperture of the optical fibers constituting the optical fiber bundle, is provided between the liquid crystal display element and the optical fiber bundle. Consequently, deterioration of the resolution of display and occurrence of moiré fringes can be prevented. Thus a display apparatus of good picture quality can be obtained.

Also because the optical fiber block comprising optical fibers of a diameter smaller than those of the optical fibers constituting the optical fiber bundle and numerical aperture greater than the numerical aperture of the optical fibers constituting the optical fiber bundle is connected to the output end face of the optical fiber bundle, the angle of emergence of light from the output end face can be increased. Consequently, the viewing angle can be increased, and further the occurrence of moiré fringes and deterioration of the resolution of display can be prevented. Thus a display apparatus of good picture quality can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A display apparatus comprising:

at least one display element having a display screen; and image transition means for transiting an image from an input end face thereof to an output end face thereof, the input end face being connected to the display screen;

wherein the image transition means includes a first optical block having first and second end faces and a second optical block having first and Second end faces, which each have a plurality of optical fibers combined together, the first end face of the first optical block constitutes the input end face of the image transition means, and the first end face of the second optical block constitutes the output end face of the image transition means;

wherein a numerical aperture of the optical fiber of the first optical block is smaller than a numerical aperture of the optical fiber of the second optical block, and a diameter of the optical fiber of the first optical block is smaller than a diameter of the optical fiber of the second optical block; and wherein a total number of the optical fibers of the first optical block per a unit area is larger than a total number of the optical fibers of the second optical block per the unit area.

2. A display apparatus according to claim 1, further comprising viewing angle expanding means connected to the output end face of the image transition means, for expanding a viewing angle of the display apparatus, the viewing angle expanding means having a plurality of optical fibers bundled together, wherein a numerical aperture of the optical fiber of the viewing angle expanding means is larger than the numerical aperture of the optical fiber of the second optical block, and a diameter of the optical fiber of the viewing angle expanding means is smaller than the diameter of the optical fiber of the second optical block.

3. A display apparatus according to claim 1, wherein the number of the display elements is two or more, and the output end face of the image transition means constitutes one display screen.

4. A display apparatus according to claim 1, wherein one optical fiber of the second optical block is connected to a plurality of optical fibers of the first optical block.

5. A display apparatus according to claim 2, wherein one optical fiber of the second optical block is connected to a plurality of optical fibers of the first optical block.

6. A display apparatus according to claim 1, wherein the second end face of the first optical block is connected to the second end face of the second optical block.

7. A display apparatus according to claim 1, wherein the numerical aperture of the optical fiber of the first optical flock is about 0.2 to 0.35, the diameter of the optical fiber of the first optical block is about 30 μm, the numerical aperture of the optical fiber of the second optical block is about 0.5, and the diameter of the optical fiber of the second optical block is about 250 μm.

* * * * *